United States Patent [19]

Hofbauer et al.

[11] 4,366,887

[45] Jan. 4, 1983

[54] VEHICLE HAVING A MAIN CLUTCH AND AN AUXILIARY CONTROLLABLE CLUTCH

[75] Inventors: Peter Hofbauer; Paulus Heidemeyer; Romanus Scholz, all of Wolfsburg, Fed. Rep. of Germany

[73] Assignee: Volkswagenwerk Aktiengesellschaft, Wolfsburg, Fed. Rep. of Germany

[21] Appl. No.: 45,757

[22] Filed: Jun. 5, 1979

[30] Foreign Application Priority Data

Jun. 6, 1978 [DE] Fed. Rep. of Germany ....... 2824730

[51] Int. Cl.³ ...................... F16D 13/44; F16D 25/08
[52] U.S. Cl. .............................. 192/48.1; 192/85 CA; 192/85 V; 192/89 B; 192/96
[58] Field of Search ................... 192/48.3, 48.1, 91 A, 192/85 CA, 96, 89 B, 88 A, 85 V, 70.27, 48.8; 180/54 R

[56] References Cited

U.S. PATENT DOCUMENTS

| | | | |
|---|---|---|---|
| 2,393,010 | 11/1946 | Arnold et al. | 192/88 A |
| 2,502,798 | 4/1950 | Nabstedt et al. | 192/91 A |
| 3,283,866 | 11/1966 | Giacosa | 192/96 |
| 3,870,116 | 3/1975 | Sellber | 180/54 R |
| 3,886,810 | 6/1975 | Sugiyama et al. | 74/572 X |
| 4,131,185 | 12/1978 | Schall | 192/89 B X |

FOREIGN PATENT DOCUMENTS 229233 12/1910 Fed. Rep. of Germany .
719124 4/1942 Fed. Rep. of Germany .

Primary Examiner—Rodney H. Bonck
Attorney, Agent, or Firm—Brumbaugh, Graves, Donohue & Raymond

[57] ABSTRACT

A clutch arrangement for a motor vehicle having an internal combustion engine for driving the vehicle and a flywheel coupled between the vehicle transmission and the engine for equalizing the non-uniformity of the engine output torque. The clutch arrangement includes a main clutch arranged between the flywheel and the main transmission for interrupting the coupling for shifting gears and an auxiliary controllable clutch arranged between the engine and flywheel for automatically interrupting the coupling of the engine and flywheel. The controllable clutch comprises a spring disc clutch free from rotational play and is arranged so that the direction of force for actuating the main clutch, for interrupting the coupling between the flywheel and transmission, is opposed to the direction of the force for actuating the auxiliary controllable clutch.

8 Claims, 2 Drawing Figures

VEHICLE HAVING A MAIN CLUTCH AND AN AUXILIARY CONTROLLABLE CLUTCH

BACKGROUND OF THE INVENTION

The present invention relates to a motor vehicle having an internal combustion engine coupled to a transmission to drive the vehicle, a flywheel between the engine and transmission for equalizing the non-uniformity of the engine output torque, a main clutch arranged between the flywheel and transmission for shifting gears, and an auxiliary controllable clutch between the engine and flywheel for automatically interrupting the coupling at predetermined operating states of the vehicle.

A motor vehicle having a main clutch and auxiliary controllable clutch is shown and described in commonly owned U.S. patent Application Ser. No. 955,186, filed Oct. 27, 1978 and now U.S. Pat. No. 4,252,208. The auxiliary controllable clutch is actuated automatically to interrupt the coupling between the engine and transmission at operating states in which the engine does not drive the vehicle and the flywheel rotates above a predetermined minimum speed, as normally occurs during idling or deceleration. The engine is recoupled to the flywheel when such operating conditions are terminated. During such times as the flywheel is disconnected from the engine, during idling or deceleration, the engine is stopped to result in savings in fuel consumption and reduction of the overall pollutants emitted.

SUMMARY OF THE INVENTION

The present invention is an improvement of the apparatus disclosed in Patent Application Ser. No. 955,186. More particularly, the present invention comprises an improved clutch arrangement for a motor vehicle having an engine and a flywheel coupled to the engine for equalizing the non-uniformity of the engine output torque. A main clutch is arranged between the engine and transmission to interrupt the coupling while shifting gears and an auxiliary clutch is arranged between the engine and flywheel for interrupting the coupling at predetermined operating states of the engine. The controllable clutch comprises a spring disc clutch which is free from rotational play, and the direction of force for actuating the main clutch for interrupting the coupling of the engine to the transmission is opposed to the direction of force for actuating the controllable clutch.

In the preferred embodiment of the invention, the controllable clutch includes a spring disc having a central opening, a pull ring arranged in the central opening and engaging the disc, and a pull rod coupled to the pull ring and extending through a central bore in the input shaft of the transmission. This arrangement ensures favorable load conditions for the actuating bearings for the two clutches and for the bearing mounting the flywheel to the crankshaft. Also, both clutches may be actuated without a substantial increase in mechanical force when compared to those having one clutch.

The pull rod for actuating the auxiliary controllable clutch may be connected at its other end to a servo motor, either pneumatically or hydraulically actuated, which, in turn, is controlled responsive to one or more engine operating parameters. The controllable clutch includes a clutch disc coupled to the engine and disposed between a first pressure plate and a second pressure plate coupled to the flywheel. Clutch linings are fixedly attached on either side of the clutch disc for engaging the first and second pressure plates. A spring disc, which acts on the first pressure plate, is locked in the rotational direction for rotation with the flywheel and for rotation with the first pressure plate. The locking arrangement may be in the form of a series of conical lugs and corresponding indentations in the pressure plate, spring disc, and flywheel.

In the preferred embodiment of the invention, the flywheel has a central pivot shaft, which is received in a recess in the crankshaft for rotatably mounting the flywheel to the crankshaft.

For a better understanding of the invention, reference is made to the following detailed description of the preferred embodiment, taken in conjunction with the drawings of the invention.

DETAILED DESCRIPTION OF A PREFERRED EMBODIMENT

Figure 1:
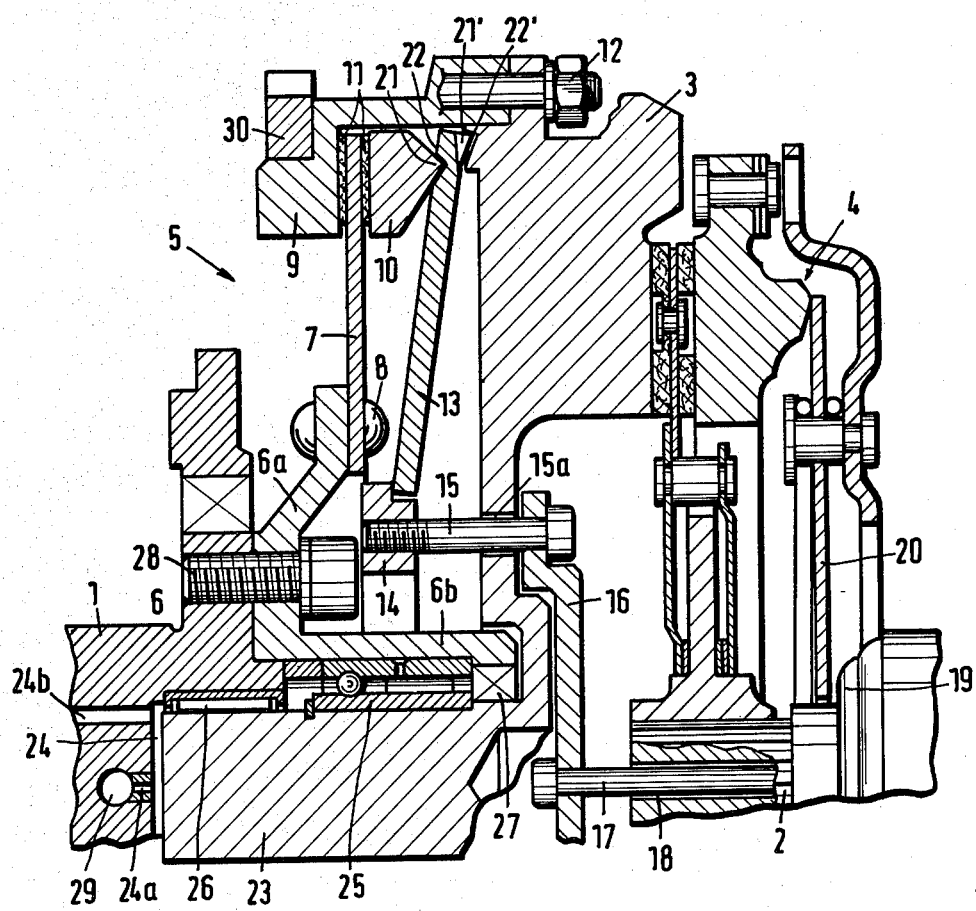
FIG. 1 is a longitudinal sectional view of a main clutch and an auxiliary clutch according to the present invention.

Referring to the drawings, the crankshaft 1 of an internal combustion engine is coupled, by an auxiliary controllable clutch 5, a flywheel 3, and main clutch 4 to the input shaft 2 of the engine transmission (not shown) to drive the vehicle. The flywheel 3, which is arranged between the clutches 4 and 5, equalizes the non-uniformity of the engine output torque. The main clutch 4 is a conventional spring disc clutch for interrupting the coupling between the engine and transmission while shifting gears.

The auxiliary controllable clutch 5 is arranged between the engine crankshaft 1 and the flywheel 3. The controllable clutch 5, also a spring disc clutch, is automatically actuated by a servo motor (FIG. 2) for interrupting the coupling between the engine and flywheel 3 at predetermined operating states of the vehicle, as described below. The controllable clutch 5 includes a clutch disc 7 coupled to the crankshaft 1 by a hub 6. A plurality of fastening screws 28 connect the hub 6 to the crankshaft 1, and a disc-shaped flange 6a of the hub 6 carries the clutch disc 7, which is fastened to the flange 6a by a plurality of rivets 8 or bolts spaced circumferentially. Thus, the clutch disc 7 is coupled to the crankshaft 1 without rotational play.

The clutch disc 7 also has friction linings 11 along the radial rim, which are secured without rotational play, without the conventional spring mounting and riveting, for example, by soldering or sintering in place. Preferably, the linings 11 have a high modulus of elasticity. The fixed connection may be strengthened by joining the linings 11 through openings (not shown in the drawings) provided in the clutch disc 7.

The friction linings 11 of the clutch disc 7 are disposed between the first pressure plate 10 and a second pressure plate 9. The second pressure plate 9 is arranged bell-fashion relative to the clutch disc 7 and rigidly connected to the flywheel 3 by studs 12. A spring disc 13 acts on the first pressure plate 10 to urge the clutch disc 7 into engagement with the first and second pressure plates 10 and 9 for coupling the engine crankshaft 1 to the flywheel 3.

In accordance with the present invention, the first pressure plate 10, the spring disc 13 and the flywheel 3 are arranged to rotate without rotational play when the controllable clutch is engaged. A first set of conical lugs 21, spaced circumferentially around the pressure plate 10, are received in conical indentations 22 in the spring disc 13 to provide non-rotatable engagement. Correspondingly, a second set of conical lugs 21' on the spring disc 13 engage cooperating conical indentations 22' in the flywheel 3. When the clutch 5 is engaged, the spring disc 13 also urges the lugs 21, 21' into engagement with the respective recesses 22, 22'.

The spring disc 13, which normally biases the controllable clutch into its engaged position, is coupled to a pull rod 17 for actuating the clutch 5 to interrupt the coupling between the engine and the flywheel 3. A pull ring 14 is disposed in a central opening in the spring disc 13 to engage the spring disc 13. A plurality of tension pins 15, which extend through holes 15a in the flywheel, connect the pull ring 14 to a pull plate 16. The pull rod 17 engages the pull plate 16 to complete the coupling to the spring disc 13.

The pull rod 17 extends concentrically through a central bore 18 in the transmission input shaft 2 and is attached at its other end to a pneumatic servo motor 31 (FIG. 2) to be movable longitudinally to actuate the controllable clutch.

The flywheel 3 has a central pivot shaft 23 extending longitudinally therefrom which is received in the hub portion 6b of the hub 6 and in a recess 24 in the face of the crankshaft 1. The flywheel 3 is rotatably mounted by bearings 25 and 26 to the hub 6 and crankshaft 1. The bearing 25 between the hub 6b and central pivot shaft 23 is also an axial thrust bearing. This arrangement, in which the flywheel 3 is rotatably mounted to the crankshaft 1 or the hub member 6 rigidly connected to it, at a comparatively long axial distance, permits the use of relatively compact and therefore low-loss bearings. Moreover, the bearings may be sealed using a single seal 27. Also, the engine torque is transmitted directly from the crankshaft 1, by the disc flange 6a, to the clutch disc 7, and thus the hub portion 6b carrying the bearing 25 does not transmit the driving load.

The bearings 25 and 26 may be grease lubricated or may be connected to the engine bearing oil delivery system, indicated at 29. In the latter case, the recess 24, in which the central pivot shaft 23 and bearings 25, 26 are received, is connected by a small passage 24a to the transverse oil passage 29, to supply engine bearing oil to the bearings 25 and 26. A second passage 24b, arranged eccentric to the crankshaft center line and extending axially is provided to return oil to the engine in the region of the last throw of the crankshaft. The diameter and location of the supply and drain passages are chosen to obtain a desired oil level in the bearing space 24.

Figure 2:
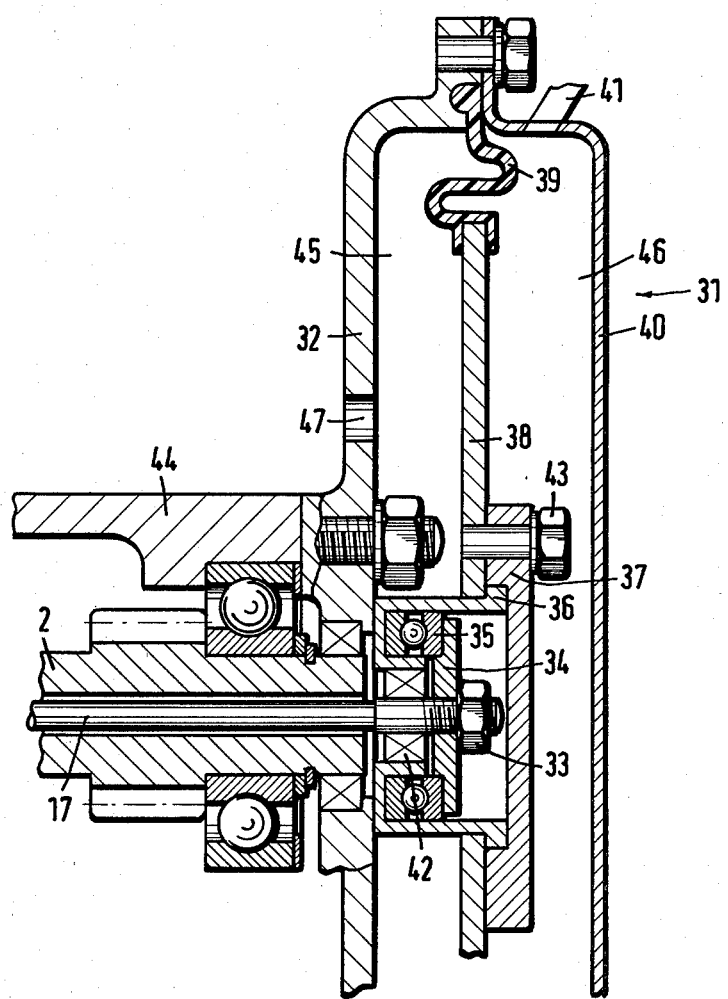
FIG. 2 is a longitudinal sectional view of a pneumatic servo motor for actuating the controllable clutch.

Referring to FIG. 2, the other end of the pull rod 17 for actuating the controllable clutch 5 is connected to a pneumatic servo motor 31. The two halves 32 and 40 of the servo motor housing are fastened to the transmission housing 44. A plate 38 is coupled to the pull rod 17 and sealed off at its radial periphery by an outer membrane 39, thus dividing the servo motor housing 32, 40 into two pressure chambers 45 and 46. The first pressure chamber 45 is connected by a passage 47 to atmosphere, and the second chamber 46 is connected to a source of suction through fitting 41.

The pull rod 17 is attached to a pull plate 34 by a nut 33. The pull plate 34 engages a thrust bearing 35 which is held in a shell 36 of C-shaped cross-section. The radial outer flange of shell 36 is clamped between the plate 38 and a cover 37 by fastening screws 43. A seal 42 is disposed between the radial inner flange of the shell 36 and the pull rod 17.

As assembled, pull rod 17, pull plate 34, thrust bearing 35, shell 36 and plate 38 are urged toward the left by the axial force exerted by the spring disc 13, urging the face of the C-shaped shell 36 against the inside of the housing half 32.

Under predetermined operating conditions of the motor vehicle, for example, under deceleration or idling, the second chamber 46 is evacuated through the fitting 41, and the rubber-like diaphragm 39 and plate 38 are moved toward the right, thus moving the pull rod to disengage the controllable clutch 5. Correspondingly, when the pressure in the chamber 46 is increased as will occur upon termination of the engine operating conditions causing actuation of the controllable clutch, the tension of the spring disc 13 pulls the rod 17 and plate 38 toward the left until the shell 36 engages the inner wall of the housing half 32. Suction in the chamber 46 may be controlled by a valve actuated by an engine operating parameter, e.g. the position of the accelerator pedal. The operation of the auxiliary controllable clutch 5 is as described in U.S. Application Ser. No. 955,186, which is incorporated herein by reference.

In the drawings, the main clutch 4 and auxiliary controllable clutch 5 are each shown in the engaged position. The auxiliary clutch 5 is actuated (disengaged) by subjecting the pull rod 17 to a force directed to the right. Correspondingly, the main clutch 4 is actuated by a force on the radial inner edge of the spring disc 20 (imparted by the bearing 19) toward the left in the drawing. Thus, when both clutches 4 and 5 are actuated simultaneously, the two actuating forces will at least partially cancel each other out. Under most operating conditions, both clutches will in fact be actuated simultaneously, as described in U.S. patent Application Ser. No. 955,186. Thus, the clutch bearings need be designed to absorb only the force resultant from the actuation of an individual clutch, in the instance when only one of the clutches is disengaged, rather than be designed to withstand the aggregate forces arising if both clutches were actuated simultaneous and the directions of the actuating forces were the same.

Thus, in accordance with the present invention, a main clutch 4 and auxiliary controllable clutch 5 have a comparably simple mechanical arrangement in a relatively compact space axially and permit actuation of the main clutch in substantially the same manner as conventional vehicles.

A relatively compact arrangement is provided between the crankshaft 1 and controllable clutch 5 and also the flywheel 3, since the flywheel 3 is mounted to the crankshaft 1 itself on comparatively small bearings 25, 26, thus, minimizing the braking torque in the disengaged position. This arrangement also permits a single seal 27 for the flywheel mounting, reducing the risk of oil seepage into the main and auxiliary clutches from the bearing space 24.

The invention has been described above with reference to one preferred embodiment thereof. Variations and modifications of the invention without departing from the inventive principles disclosed herein will be apparent to those skilled in the art. For example, the first pressure plate 10 may be arranged to engage the flywheel 3 without rotational play by a plurality of spring tabs spaced around the circumference or by other suitable means. Also, the controllable clutch 5 may be actuated by a hydraulic servo motor or electric motor rather than by a pneumatic servo motor. All such variations and modifications are intended to be within the scope of the invention as defined in the following claims.

We claim:

1. In a clutch arrangement for a motor vehicle having an internal combustion engine for driving said vehicle and a flywheel means coupled between a drive transmission of said vehicle and said engine for equalizing the non-uniformity of the engine output torque, the clutch arrangement including a main clutch means arranged between said flywheel means and said transmission for interrupting said coupling for shifting gears, and an auxiliary controllable clutch means, arranged between said engine and said flywheel means, for automatically interrupting said coupling at predetermined operating states of said vehicle, the improvement wherein said transmission comprises an input shaft having a central longitudinal bore there through, wherein said controllable clutch means comprises a spring disc clutch means for producing engagement free from rotational play between said engine and said flywheel means when said disc clutch means are engaged, said controllable clutch means including a spring disc having a central opening, a pull ring arranged in said opening and engaging said disc, and a pull rod coupled at one end to said ring and extending through said central bore, wherein the direction of force for actuating said main clutch for interrupting said coupling is opposed to the direction of force for actuating said controllable clutch.

2. Apparatus according to claim 1, comprising servo motor means acting on the other end of said pull rod for actuating said controllable clutch for interrupting said coupling.

3. Apparatus according to claim 1, or 2, wherein said engine comprises a crankshaft, and wherein said flywheel is rotatably mounted to said crankshaft.

4. Apparatus according to claim 3, wherein said flywheel has a central pivot shaft, and said crankshaft has a central recess for receiving said pivot shaft.

5. Apparatus according to claim 4, wherein said crankshaft has an oil passage therein, and comprising duct means having a calibrated supply orifice for connecting said oil passage and said central recess.

6. Apparatus according to claim 1, wherein said controllable clutch means comprises a clutch disc coupled to said engine, a first pressure plate for engaging said clutch disc, wherein said spring disc acts on said first pressure plate for urging said plate into engagement with said clutch disc, and means for locking in the rotational direction said spring disc for rotation with said flywheel and for rotation with said first pressure plate.

7. Apparatus according to claim 5, wherein said locking means comprises a first set of conical lugs on one of said first pressure plate and said spring disc, a first set of conical indentations on the other of said first pressure plate and said spring disc for receiving said first set of lugs, a second set of conical lugs on one of said spring disc and said flywheel, a second set of conical indentations on the other of said spring disc and said flywheel for receiving said second set of lugs, and biasing means for urging said lugs and corresponding indentations into engagement when said controllable clutch is engaged.

8. Apparatus according to claim 7, wherein said clutch disc is disposed between said first pressure plate and a second pressure plate coupled to said flywheel, comprising clutch linings fixedly attached to either side of said clutch disc for engaging said first and second pressure plate.

* * * * *

UNITED STATES PATENT AND TRADEMARK OFFICE
CERTIFICATE OF CORRECTION

PATENT NO. : 4,366,887

DATED : January 4, 1983

INVENTOR(S) : Hofbauer et al.

It is certified that error appears in the above-identified patent and that said Letters Patent is hereby corrected as shown below:

Column 6, line 21, "claim 5" should read --claim 6--.

Signed and Sealed this

Twenty-sixth Day of July 1983.

[SEAL]

Attest:

GERALD J. MOSSINGHOFF

Attesting Officer — Commissioner of Patents and Trademarks